(12) United States Patent
Matsumoto et al.

(10) Patent No.: US 11,820,334 B2
(45) Date of Patent: Nov. 21, 2023

(54) VEHICLE WIPER DEVICE

(71) Applicant: DENSO CORPORATION, Kariya (JP)

(72) Inventors: Yuuji Matsumoto, Kariya (JP); Mitsuo Odagiri, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/974,150

(22) Filed: Oct. 26, 2022

(65) Prior Publication Data

US 2023/0046669 A1 Feb. 16, 2023

Related U.S. Application Data

(63) Continuation of application No. PCT/JP2021/013563, filed on Mar. 30, 2021.

(30) Foreign Application Priority Data

May 1, 2020 (JP) ................................. 2020-081412

(51) Int. Cl.
*B60S 1/48* (2006.01)
*B60S 1/08* (2006.01)
*B60S 1/46* (2006.01)

(52) U.S. Cl.
CPC . *B60S 1/08* (2013.01); *B60S 1/46* (2013.01); *B60S 1/481* (2013.01); *B60S 1/483* (2013.01)

(58) Field of Classification Search
CPC .... B60S 1/46; B60S 1/08; B60S 1/481; B60S 1/483
USPC ...................................................... 15/250.04
See application file for complete search history.

(56) References Cited

FOREIGN PATENT DOCUMENTS

JP 2003-048517 A 2/2003
JP 2017124675 A * 7/2017 ................ B60S 1/46

* cited by examiner

*Primary Examiner* — Katina N. Henson
(74) *Attorney, Agent, or Firm* — Oliff PLC

(57) ABSTRACT

In a vehicle wiper apparatus, rotation of an output shaft of a wiper motor is converted to reciprocal rotation of a pivot shaft, and a wiper member, attached to the pivot shaft, reciprocally rotates between closed and open positions. A nozzle, provided in the wiper member, sprays a cleaning fluid towards a front side in an advancing direction of the wiper member on at least one of forward and return paths of the reciprocal rotation. A washer pump supplies the cleaning fluid to the nozzle. A round-trip time of the wiper member is detected based on a detection result of a detecting unit that detects at least a state in which the wiper member is positioned in the closed position. The washer pump is controlled based on a detected round-trip time, and is operated during rotation of the wiper member on at least one of the forward and return paths.

19 Claims, 13 Drawing Sheets

VEHICLE WIPER DEVICE

CROSS-REFERENCE TO RELATED APPLICATIONS

The present application is a continuation application of International Application No. PCT/JP2021/013563, filed on Mar. 30, 2021, which claims priority to Japanese Patent Application No. 2020-081412, filed on May 1, 2020. The contents of these applications are incorporated herein by reference in their entirety.

BACKGROUND

Technical Field

The present disclosure relates to a vehicle wiper apparatus.

Related Art

A washer apparatus that sprays a cleaning fluid in conjunction with movement of a wiper blade that wipes a windshield glass of an automobile is disclosed. The washer apparatus includes a washer pump that includes first and second pumps, first and second nozzles that are attached to the wiper blade and respectively connected to the first and second pumps in a communicating manner, and a drive circuit that operates the first and second pumps in a switching manner.

SUMMARY

One aspect of the present disclosure provides a vehicle wiper apparatus that includes: a wiper motor of which operation is controlled by a control apparatus that is mounted to a vehicle and that is operated to rotate an output shaft in one direction; a conversion mechanism that converts the rotation in one direction of the output shaft to reciprocal rotation of a pivot shaft; a wiper member that is attached to the pivot shaft, and reciprocally rotates between a closed position and an open position; a nozzle that is provided in the wiper member and is capable of spraying a cleaning fluid towards a front side in an advancing direction of the wiper member on at least one of a forward path and a return path of the reciprocal rotation; a washer pump that is operated to supply the cleaning fluid to the nozzle; and a detecting unit that is capable of detecting at least a state in which the wiper member is positioned in the closed position. A round-trip time of the wiper member is detected by the control apparatus based on a detection result of the detecting unit. The washer pump is controlled by the control apparatus, based on the detected round-trip time, and is operated during rotation of the wiper member on at least one of the forward path and the return path.

DESCRIPTION OF THE EMBODIMENTS

Figure 1:
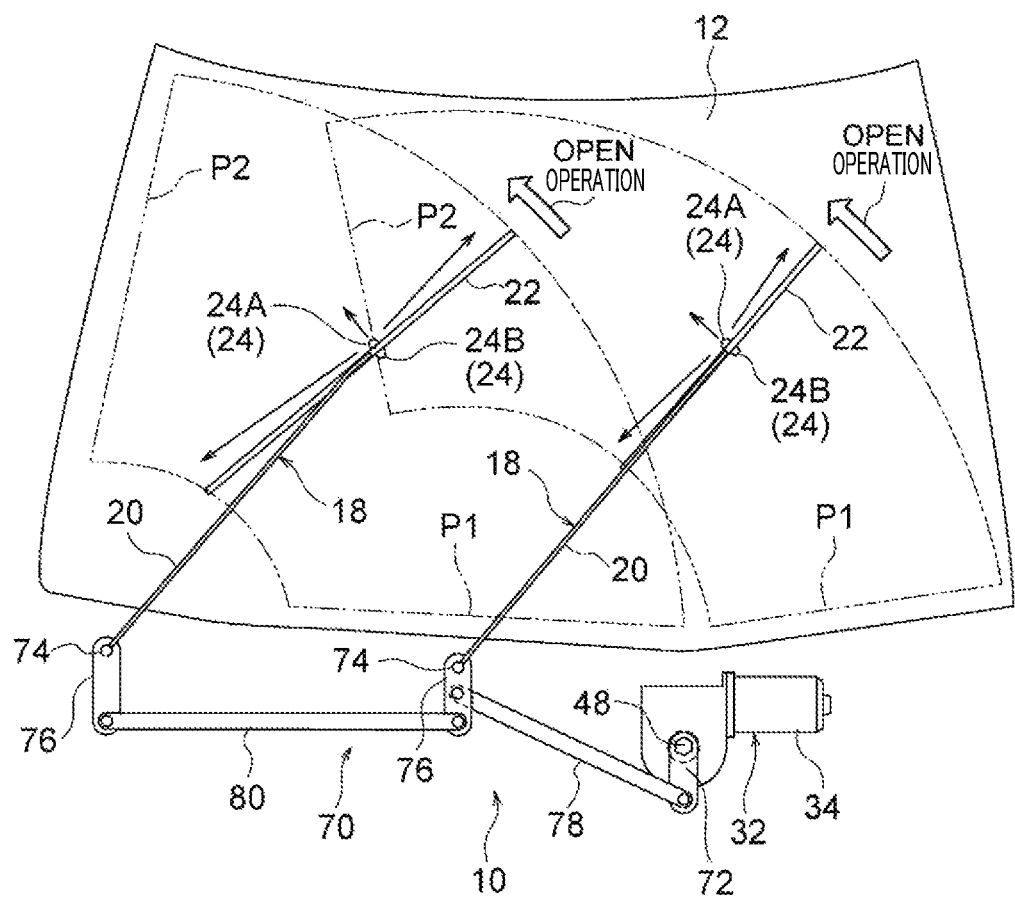
FIG. 1 is a front view of a configuration of a vehicle wiper apparatus according to a first embodiment and a periphery thereof, showing a state in which a wiper member is performing an open operation.

JP-A-2003-048517 discloses a washer apparatus that sprays a cleaning fluid in conjunction with movement of a wiper blade that wipes a windshield glass of an automobile. The washer apparatus includes a washer pump that includes first and second pumps, first and second nozzles that are attached to the wiper blade and respectively connected to the first and second pumps in a communicating manner, and a drive circuit that operates the first and second pumps in a switching manner.

The first nozzle is arranged so as to be capable of spraying the cleaning fluid near a front of the wiper blade that reciprocally moves, and is supplied the cleaning fluid by the first pump being driven. The second nozzle is arranged so as to be capable of spraying the cleaning fluid near the front of the wiper blade that reciprocally moves, and is supplied the cleaning fluid by the second pump being operated.

The drive circuit is configured to include a contact plate that has first and second contact plates and is connected to an output shaft of a wiper motor that makes the wiper blade perform a wiping operation, and a contactor of which a connection state with the first and second contact plates is switched as a result of rotation of the contact plate. When the contactor is connected to the first contact plate, an energization path is formed in the washer pump such that the first pump is driven. When the contactor is connected to the second contact plate, an energization path is formed in the washer pump such that the second pump is driven.

In the washer apparatus, the first and second pumps are separately operated by the switching of the energization paths of the washer pump as described above, and the supply of cleaning fluid to the first and second nozzles is switched. Consequently, a mechanical switching valve for the cleaning fluid is unnecessary. A structure is simplified.

However, in the above-described prior art, a relatively large drive current for driving the washer pump is directly supplied to a sliding contact between the first and second contact plates of the contact plate and the contactor that are incorporated inside the wiper motor. Therefore, there is a concern that radio noise of the wiper motor worsens, and adversely affects other electronic apparatuses on the vehicle side.

It is thus desired to provide a vehicle wiper apparatus that, in a configuration in which a cleaning fluid is sprayed towards a front side in an advancing direction of a wiper member from a nozzle that is provided in the wiper member, is capable of simplifying an overall structure of a wiper system without adversely affecting noise performance of a wiper motor.

An exemplary embodiment of the present disclosure provides a vehicle wiper apparatus that includes: a wiper motor of which operation is controlled by a control apparatus that is mounted to a vehicle and that is operated to rotate an output shaft in one direction; a conversion mechanism that converts the rotation in one direction of the output shaft to reciprocal rotation of a pivot shaft; a wiper member that is attached to the pivot shaft, and reciprocally rotates between a closed position and an open position; a nozzle that is provided in the wiper member and is capable of spraying a cleaning fluid towards a front side in an advancing direction of the wiper member on at least one of a forward path and a return path of the reciprocal rotation; a washer pump that is operated to supply the cleaning fluid to the nozzle; and a detecting unit that is capable of detecting at least a state in which the wiper member is positioned in the closed position. A round-trip time (T) of the wiper member is detected by the control apparatus based on a detection result of the detecting unit. The washer pump is controlled by the control apparatus, based on the detected round-trip time, and is operated during rotation of the wiper member on at least one of the forward path and the return path.

In the vehicle wiper apparatus of the present disclosure, the operation of the wiper motor is controlled by the control apparatus that is mounted to the vehicle. The wiper motor is operated to rotate the output shaft in one direction. The rotation in one direction of the output shaft is converted to reciprocal rotation of the pivot shaft by the conversion mechanism. As a result, the wiper member that is attached to the pivot shaft reciprocally rotates between the closed position and the open position. The nozzle that is provided in the wiper member is capable of spraying the cleaning fluid towards the front side in the advancing direction of the wiper member on at least one of the forward path and the return path of the reciprocal rotation. The cleaning fluid is supplied to the nozzle by the washer pump being operated.

In addition, the vehicle wiper apparatus of the present disclosure includes the detecting unit that is capable of detecting the state in which the wiper member is positioned in the closed position. When the wiper member is reciprocally rotating as described above, the state in which the wiper member is positioned in the closed position is detected by the detecting unit at a fixed time interval. The control apparatus detects the round-trip time of the wiper member based on the detection result of the detecting unit. In addition, the control apparatus controls operation of the washer pump based on the detected round-trip time. As a result, the washer pump is operated during rotation of the wiper member on at least one of the forward path and the return path. The cleaning fluid is sprayed towards the front side in the advancing direction of the wiper member from the nozzle. According to this configuration, a mechanical switching valve for the cleaning fluid is unnecessary and a structure is simplified. Furthermore, the above-described detecting unit is merely required to be that which is capable of acquiring an electrical signal that enables detection of at least the state in which the wiper member is positioned in the closed position, and is not that to which a relatively large drive current for driving the washer pump is supplied. Consequently, for example, even in a case in which the above-described detecting unit is mounted in the wiper motor, radio noise of the wiper motor can be prevented from worsening and adversely affecting other electrical apparatuses on the vehicle side.

The above-described exemplary embodiments of the present disclosure will be further clarified through the detailed description herebelow, with reference to the accompanying drawings.

First Embodiment

A vehicle wiper apparatus 10 (referred to, hereafter, as simply a "wiper apparatus 10") according to a first embodiment of the present disclosure will hereinafter be described with reference to FIG. 1 to FIG. 11. Here, in the drawings, some reference numbers may be omitted in terms of facilitating clarity of the drawings.

(Configuration)

Figure 2:
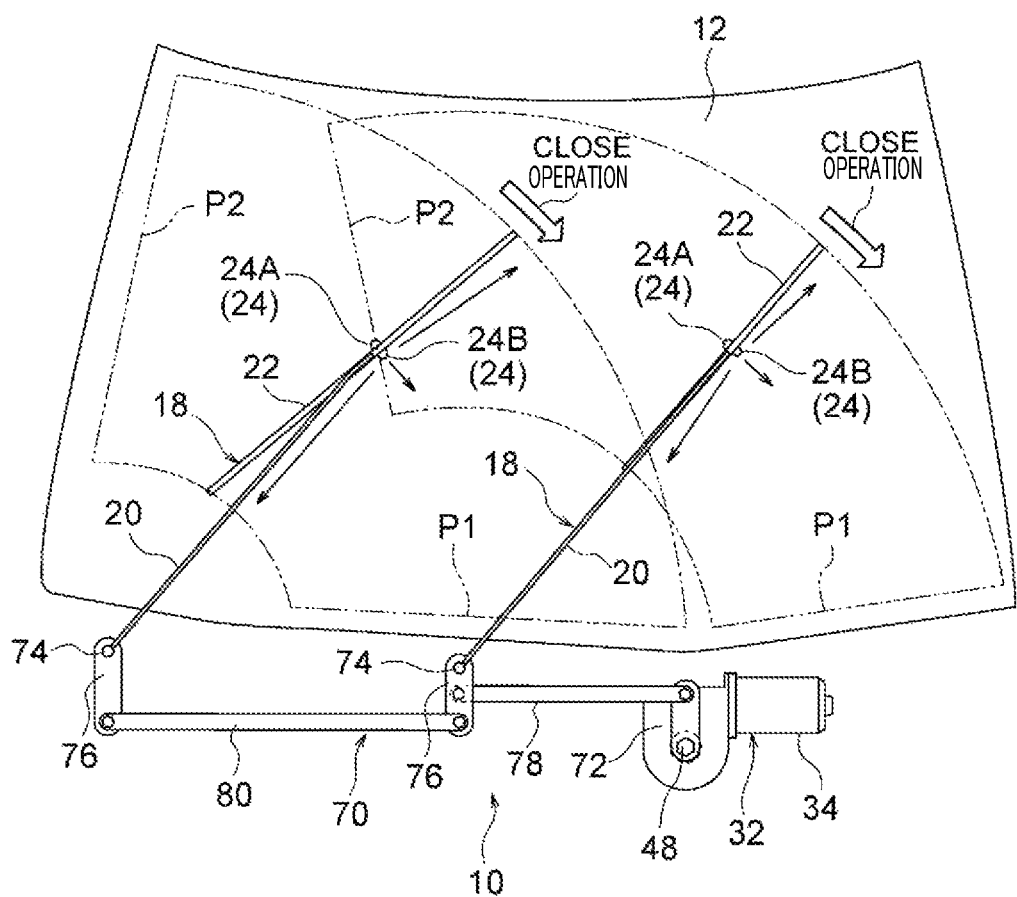
FIG. 2 is a front view corresponding to FIG. 1, showing a state in which the wiper member is performing a close operation.

As shown in FIG. 1 and FIG. 2, as an example, the wiper apparatus 10 according to the present embodiment is a front wiper apparatus for wiping a front windshield 12 of a vehicle. The wiper apparatus 10 includes a wiper motor 32, a link mechanism 70 that serves as a conversion mechanism, and a pair of left and right wiper members 18. The left and right wiper members 18 are each configured by a wiper arm 20 and a wiper blade 22 that is connected to a tip end portion of the wiper arm 20.

Figure 3:
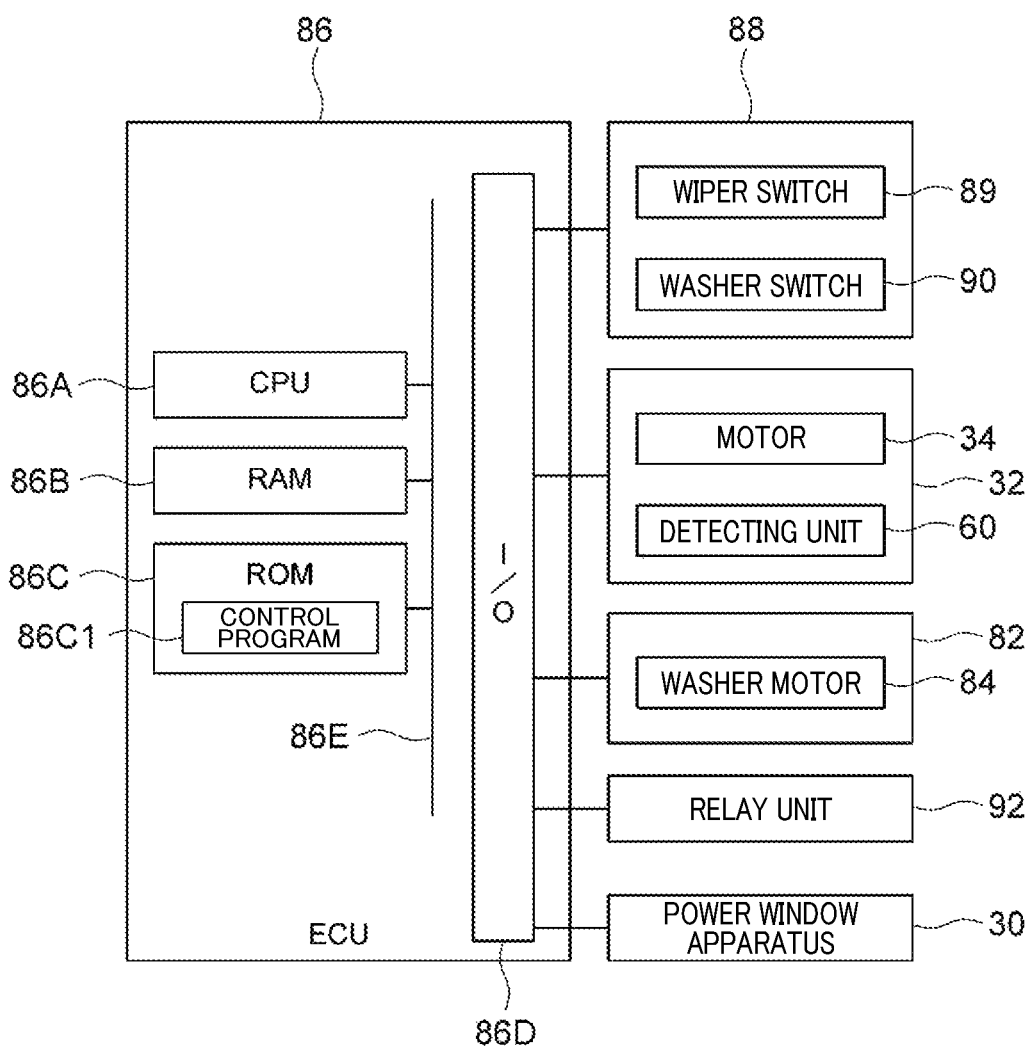
FIG. 3 is a block diagram illustrating a control system of the vehicle wiper apparatus according to the first embodiment.
Figure 4:
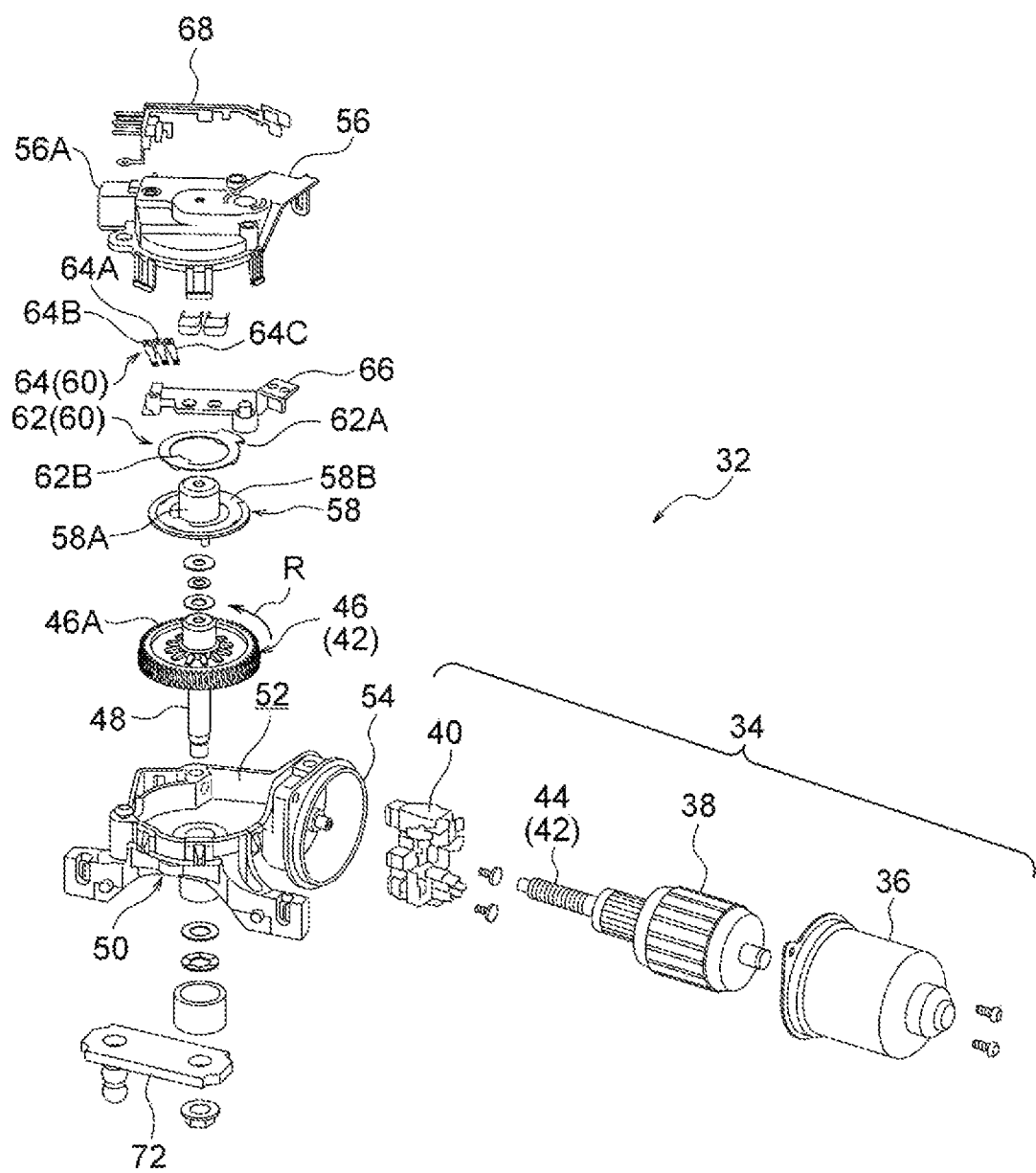
FIG. 4 is an exploded perspective view of a wiper motor that is included in the vehicle wiper apparatus according to the first embodiment.

In addition, the wiper apparatus 10 includes a nozzle 24 that is attached to each of the left and right wiper members 18, a washer pump 82 that supplies a cleaning fluid to each nozzle 24 (see FIG. 3), and a detecting unit 60 that is provided in the wiper motor 32 (see FIG. 3). As shown in FIG. 3, the wiper motor 32 and the washer pump 82 are electrically connected to an electronic control unit (ECU) 86 that serves as a control apparatus, and are configured such that operations are controlled by electrical signals from the ECU 86.

The above-described ECU 86 is mounted to the vehicle. In addition to the wiper motor 32 and the washer pump 82, the ECU 86 is also configured to control electronic components such as a power window apparatus 30. Here, according to the present embodiment, the ECU 86 that is the control apparatus and the wiper apparatus 10 are separate constituent elements. However, this is not limited thereto. The control apparatus may be a constituent element of the wiper apparatus 10.

The above-described wiper motor 32 is a wiper motor of a type in which an output shaft 48 is rotated in one direction around an axis. One end portion of a crank arm 72 that is a constituent member of the link mechanism 70 is fixed to the output shaft 48 of the power motor 32. The link mechanism 70 includes a pair of left and right pivot shafts 74 to which base end portions of the left and right wiper arms 20 are respectively fixed, a pair of left and right pivot levers 76 of which respective one end portions are fixed to the left and right pivot shafts 74, a first link rod 78 that spans between one pivot lever 76 and the crank arm 72, and a second link rod 80 that spans between other end portions of the left and right pivot levers 76.

In the wiper apparatus 10, when the crank arm 72 is rotated (continuously rotated) in one direction around the axis of the output shaft 48 of the power motor 32 integrally with the output shaft 48, a rotation drive force of the crank arm 72 is transmitted to one pivot lever 76 through the first link rod 78. The rotation drive force of the pivot lever 76 is transmitted to the other pivot lever 76 through the second link rod 80. The left and right pivot levers 76 reciprocally rotate around axes of the left and right pivot shafts 74 integrally with the left and right pivot shafts 74. As a result, the left and right wiper members 18 reciprocally rotate in conjunction in a same direction on the front windshield 12, and the left and right wiper blades 22 reciprocally wipe the front windshield 12. In this case, each wiper member 18 reciprocally rotates between a closed position (downward inverted position) P1 and an open position (upward inverted position) P2. The left and right wiper members 18 are configured to be arranged in the closed position (downward inverted position P1) during an ordinary time when the wiper motor 32 is not operating.

In the description below, as indicated by an "OPEN operation" arrow in FIG. 1, a wiping operation of each wiper member 18 on a forward path from the closed position P1 to the open position P2 is referred to as an "open operation." In addition, in the description below, as indicated by a "CLOSE operation" arrow, a wiping operation of each wiper member 18 on a return path from the open position P2 to the closed position P1 is referred to as a "close operation." Furthermore, in the description below, the left and right wiper members 18 are simply referred to as a "wiper member 18."

As shown in FIG. 1 and FIG. 2, a first nozzle 24A and a second nozzle 24B that are the nozzle 24 are attached to the wiper member 18. The first nozzle 24A and the second nozzle 24B are attached to a tip end portion of the wiper arm 20 or an intermediate portion in a long direction of the wiper blade 22, and are arranged at attitudes that are oriented opposite each other in a rotation direction of the wiper member 18. During the open operation (that is, on the forward path of the reciprocal rotation of the wiper member 18), the first nozzle 24A is capable of spraying the cleaning fluid towards a front side in an advancing direction of the wiper member 18. During the close operation (that is, on the return path of the reciprocal rotation of the wiper member 18), the second nozzle 24B is capable of spraying the cleaning fluid towards the front side in the advancing direction of the wiper member 18.

The first nozzle 24A and the second nozzle 24B are each connected to the washer pump 82, shown in FIG. 3, by a hose (not shown). The washer pump 82 is connected to a washer tank (not shown) that stores the cleaning fluid (washer fluid) by a hose (not shown). The washer pump 82 includes a washer motor 84 (see FIG. 9) that is a drive source and an impeller (not shown) that is rotated by the washer motor 84. The washer pump 82 is configured such that the cleaning fluid is supplied to the first nozzle 24A when the washer motor 84 is rotated forward, and the cleaning fluid is supplied to the second nozzle 24B when the washer motor 84 is rotated in reverse.

As described above, the above-described washer motor 84 and wiper motor 32 are electrically connected to the ECU 86 that is mounted to the vehicle. The ECU 86 includes a central processing unit (CPU) (processor) 86A, a random access memory (RAM) 86B, a read-only memory (ROM) 86C, and an input/output interface (I/O) 86D that performs communication with an external apparatus. The ECU 86 is configured such that these components are communicably connected to one another by a bus 86E.

The CPU 86A is a central calculation processing unit. The CPU 86A runs various programs and controls each section. That is, the CPU 86A reads a control program 86C1 from the ROM 86C and runs the control program 86C1 with a RAM 86B as a work area. The CPU 86A is configured to perform control of each constituent element and perform various calculation processes based on the control program 86C1 that is recorded in the ROM 86C. Here, the control apparatus may be configured by a plurality of electronic control units or may be actualized by either of hardware and software.

In addition to the wiper motor 32 and the washer motor 84, a motor for the power window apparatus 30 that is mounted to the vehicle and the like are electrically connected to the input/output interface unit 86D. In addition, a wiper/washer switch 88 that is provided in a steering column or the like of the vehicle is electrically connected to the input/output interface unit 86D.

The wiper/washer switch 88 includes a wiper switch 89 that operates the wiper motor 32, and a washer switch 90 that operates the wiper motor 32 and the washer motor 84. For example, the wiper/washer switch 88 is configured to include a rotatably operable lever. For example, the wiper switch 89 is capable of being switched to a mist mode selection position at which the wiper motor 32 is operated in mist mode (MIST), an intermittent wiping mode selection position at which the wiper motor 32 is operated in intermittent wiping mode (INT), a low-speed wiping mode selection position at which the wiper motor 32 is operated in low-speed wiping mode (LOW), a high-speed wiping mode selection position at which the wiper motor 32 is operated in high-speed wiping mode (HIGH), and an OFF position at which operation of the wiper motor 32 is stopped, by the above-described lever being rotatably operated in a vehicle up/down direction. For example, the washer switch 90 may be configured so as to be turned ON only while the above-described lever is rotatably operated towards a vehicle rear side (an operation in which the lever is drawn closer).

The above-described washer motor 84 is configured such that its operation is controlled by the ECU 86 based on a detection result of the detecting unit 60 that is provided in the wiper motor 32. Hereafter, configurations of the wiper motor 32 and the detecting unit 60 will be described with reference to FIG. 4 to FIG. 7.

The wiper motor includes a motor 34, a deceleration mechanism 42 that decelerates rotation of the motor 34, a housing 50 that houses the deceleration mechanism 42, and the output shaft 48 that is supported by the housing 50 and rotates so as to be decelerated by the deceleration mechanism 42. As an example, the motor 34 is a brush motor. For example, the housing 50 may be manufactured by die casting of an aluminum alloy. The housing 50 is formed into a flat, substantially rectangular box shape of which a thickness dimension in an axial direction of the output shaft 48 is small. The housing 50 has a housing chamber 52 that is open on one side (upper side in FIG. 4) in the axial direction of the output shaft 48. For example, an opening portion of the housing chamber 52 may be configured so as to be sealed by a cover 56 that is made of resin.

In addition, a circular, cylindrical motor connecting portion 54 is formed in one end portion of the housing 50. A yoke 36 of the motor 34 is fixed to the motor connecting portion 54. An armature 38 of the motor 34 is housed inside the yoke 36. A brush holder 40 is housed inside the above-described motor connecting portion 54. A shaft of the armature 38 has a portion that extends inside the housing chamber 52 of the housing 50. A worm 44 is formed by rolling on an outer circumferential surface of this extending portion. The worm 44 meshes with a worm wheel 46 that is housed inside the housing chamber 52. The worm 44 and the worm wheel 46 configure the deceleration mechanism 42. In addition, the worm wheel 46 corresponds to a "gear" in the present disclosure and rotates (continuously rotates) in one direction around the axis (in an arrow R direction in FIG. 4 and FIG. 5) integrally with the output shaft 48, during operation of the wiper motor 32.

The output shaft 48 is coaxially fixed to an axial center portion of the worm wheel 46. The worm wheel 46 is rotatably supported to the housing 50 by the output shaft 48. A tip end side of the output shaft 48 extends towards a side opposite the cover 56 in relation to the worm wheel 46 and protrudes outside the housing 50. The above-described crank arm 72 is fixed to the tip end portion of the output shaft 48.

Figure 5:
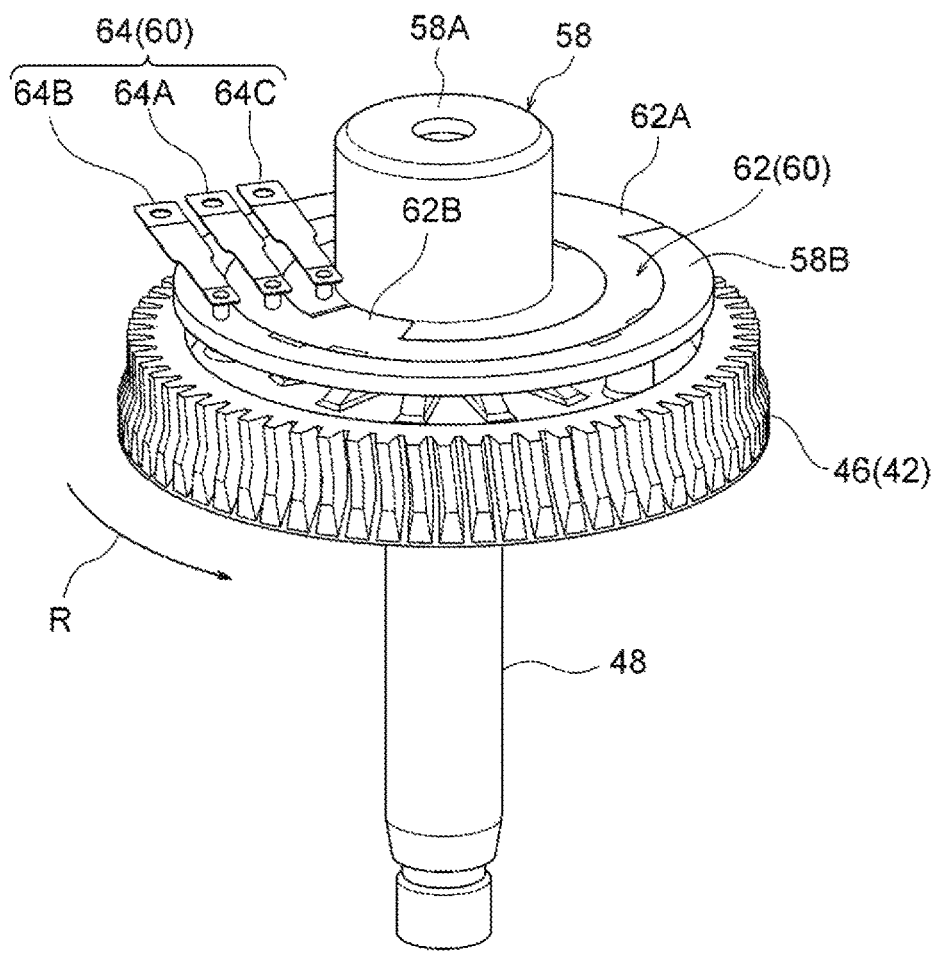
FIG. 5 is a perspective view of a configuration of a detecting unit that is mounted in the wiper motor and a periphery thereof.
Figure 6:
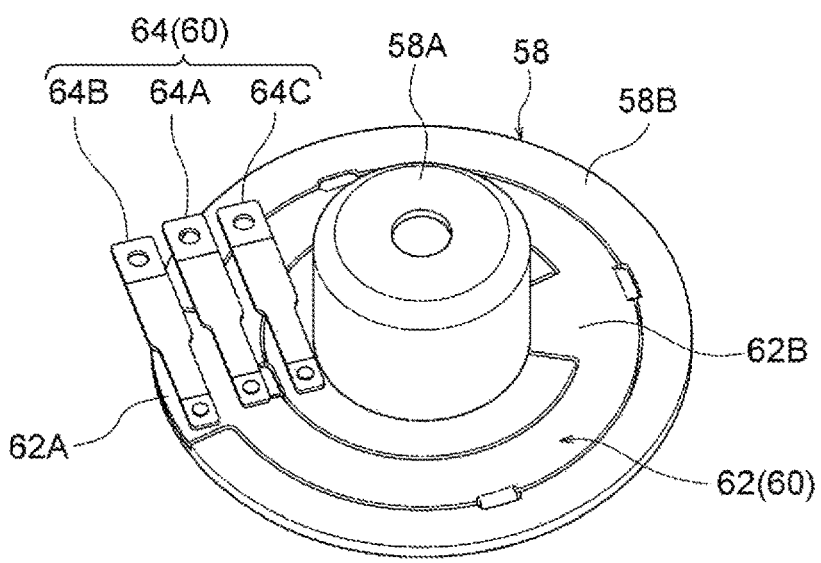
FIG. 6 is a perspective view of a portion of the configuration shown in FIG. 5, viewed from an angle differing from that in FIG. 5.
Figure 7:
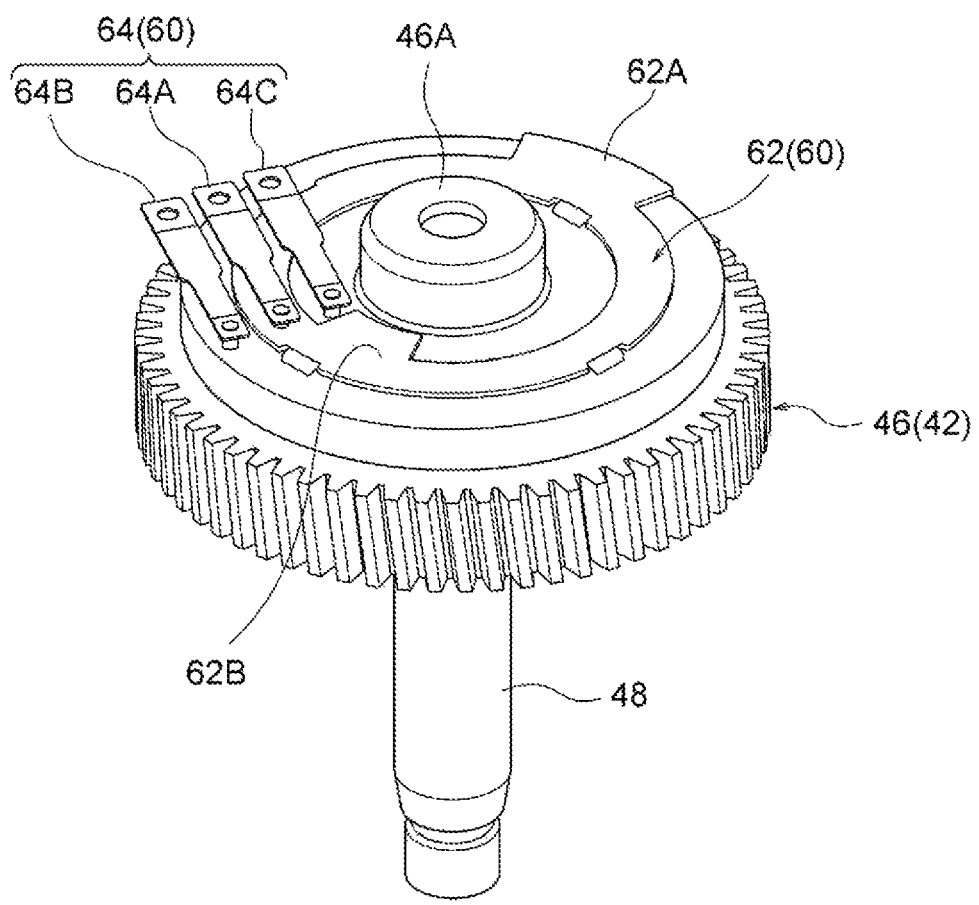
FIG. 7 is a perspective view of a variation example of the configuration shown in FIG. 5.

An insulator 58 that is made of an insulating material such as resin is attached to a surface on the cover 56 side of the worm wheel 46 (a surface on a side opposite a protruding direction of the output shaft 48). The insulator 58 is formed into a substantially circular plate shape and is arranged concentrically with the worm wheel 46. As shown in FIG. 5 and FIG. 6, the insulator 58 is configured by a boss portion 58A and a flange portion 58B. The boss portion 58A is formed into a bottomed cylindrical shape that is open towards the worm wheel 46 side. The flange portion 58B extends from an end portion on the opening side of the boss portion 58A towards an outer side in a radial direction in a flange shape. Inside the boss portion 58A, a circular columnar boss portion 46A (see FIG. 4) that is formed in a center portion of the worm wheel 46 is housed. In this housed state, protrusions that are formed so as to protrude in directions approaching each other from the insulator 58 and the worm wheel 46 engage during rotation in one direction of the worm wheel 46, and the insulator 58 and the worm wheel 46 integrally co-rotate. Here, the insulator 58 shown in FIG. 5 is configured such that engagement of the respective protrusions is released and therefore co-rotation does not occur in a rotation that is less than a single rotation in the other direction of the worm wheel 46.

A cam plate 62 is attached to a surface on the cover 56 side of the flange portion 58B. For example, the cam plate 62 may be formed into a ring shape by a metal plate that has conductivity and be fixed to the flange portion 58B by a means such as claw fitting. The cam plate 62 is indirectly attached to the worm wheel 46 by the insulator 58. During operation of the wiper motor 32, the cam plate 62 rotates in one direction (the arrow R direction in FIG. 4 and FIG. 5) around the axis as a result of integrated co-rotation in one direction of the insulator 58 with the worm wheel 46. Here, as in a variation example shown in FIG. 7, the cam plate 62 may be configured to be directly attached to the worm wheel 46. In this variation example, the cam plate 62 is directly attached to a surface on the cover 56 side of the worm wheel 46 (a surface on the side opposite the protruding direction of the output shaft 48) by a means such as claw fitting.

A close-side cam 62A that protrudes towards an outer side in a radial direction of the cam plate 62 is formed in an outer circumferential portion of the cam plate 62. An open-side cam 62B that protrudes towards an inner side in the radial direction of the cam plate 62 is formed in an inner circumferential portion of the cam plate 62. The cam plate 62 configures the detecting unit 60 together with a contact portion 64 that is arranged on the cover 56 side of the cam plate 62. Here, the close-side cam 62A may be configured to be formed in the inner circumferential portion of the cam plate 62 and the open-side cam 62B may be configured to be formed in the outer circumferential portion of the cam plate 62.

An electrical connection state of the contact portion 64 in relation to the cam plate 62 is switched by rotation of the cam plate 62. The contact portion 64 is configured by a P terminal 64A that serves as a first terminal, a CL terminal 64B that serves as a second terminal, and an OP terminal 64C that serves as a third terminal. For example, the P terminal 64A, the CL terminal 64B, and the OP terminal 64C (each of which is a contact lever) may be formed into an overall elongated plate shape by a material that has conductivity, such as metal, and be attached to an inner surface of the cover 56. Here, for example, an inner cover 66 may be made of resin and attached to the cover 56. The inner cover 66 holds an anti-noise element such as a capacitor that is electrically connected to an insert terminal 68, described hereafter.

The above-described P terminal 64A, CL terminal 64B, and OP terminal 64C are electrically connected to the insert terminal 68 that is embedded in the cover 56. One end of the insert terminal 68 is also electrically connected to a brush (not shown) that is provided in the brush holder 40, described above, and another end is drawn out from a connector portion 56A of the cover 56. A plurality of insert terminals 68 that are drawn out from the connector portion 56A have external connectors (not shown) connected thereto. A portion is electrically connected to the above-described ECU 86 and the like by a harness, and another portion is connected to a power supply or the like.

The P terminal 64A is arranged so as to be in contact with the cam plate 62 at all times, regardless of the rotation position of the cam plate 62. The CL terminal 64B is arranged so as to be in contact with the close-side cam 62A of the cam plate 62 in a state in which the wiper member 18 is positioned in the closed position P1. The OP terminal 64C is arranged so as to be in contact with the open-side cam 62B of the cam plate 62 in a state in which the wiper member 18 is positioned in the open position P2. The above-described "in contact with" is synonymous with "electrically connected to."

During operation of the wiper motor 32, the cam plate 62 is integrally rotated in one direction around the axis with the output shaft 48, and the CL terminal 64B and the OP terminal 64C are alternately switched between connection and disconnection to the cam plate 62. Specifically, when the wiper member 18 that performs the open operation reaches the open position P2, the OP terminal 64C comes into contact with the open-side cam 62B, and the OP terminal 64C and the P terminal 64A are electrically connected. When the cam plate 62 rotates 180 degrees from this state, the OP terminal 64C and the open-side cam 62B are disconnected. In addition, the CL terminal 64B comes into contact with the close-side cam 62A, and the CL terminal 64B and the P terminal 64A are electrically connected. During this 180-degree rotation, the wiper member 18 performs the close operation from the open position P2. When the wiper member 18 reaches the closed position P1, the CL terminal 64B and the P terminal 64A are electrically connected.

Electrical connection states of the P terminal 64A, the CL terminal 64B, and the OP terminal 64C are outputted as electrical signals and detected. Thus, the state in which the wiper member 18 is positioned in the closed position P1 and the state in which the wiper member 18 is positioned in the open position P2 can be detected. The P terminal 64A and the OP terminal 64C are electrically connected to the input/output interface unit 86D of the ECU 86. The CL terminal 64B is connected to the ground.

Figure 8:
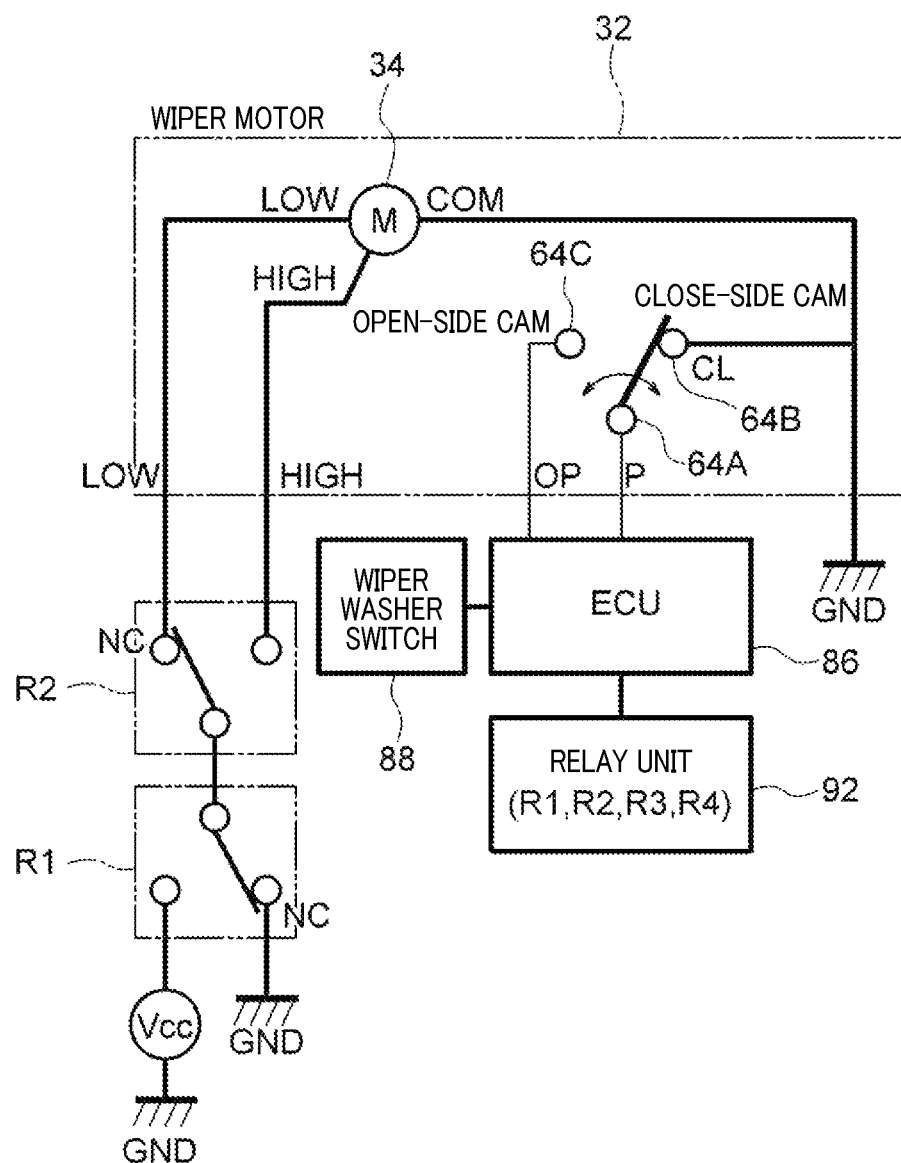
FIG. 8 is a circuit diagram illustrating a control circuit of the wiper motor.
Figure 9:
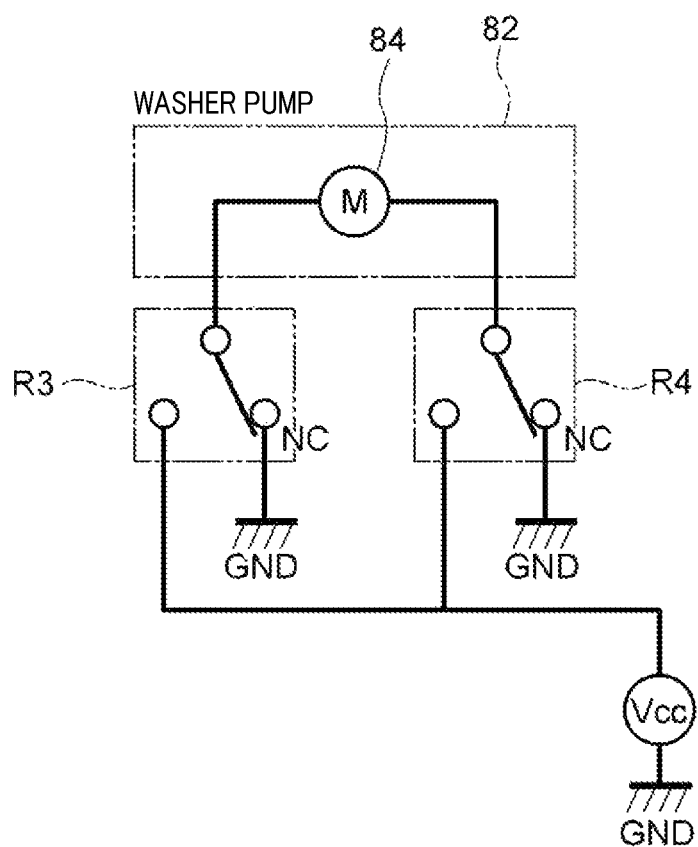
FIG. 9 is a circuit diagram illustrating a control circuit of a washer motor that is included in the vehicle wiper apparatus according to the first embodiment.
Figure 10:
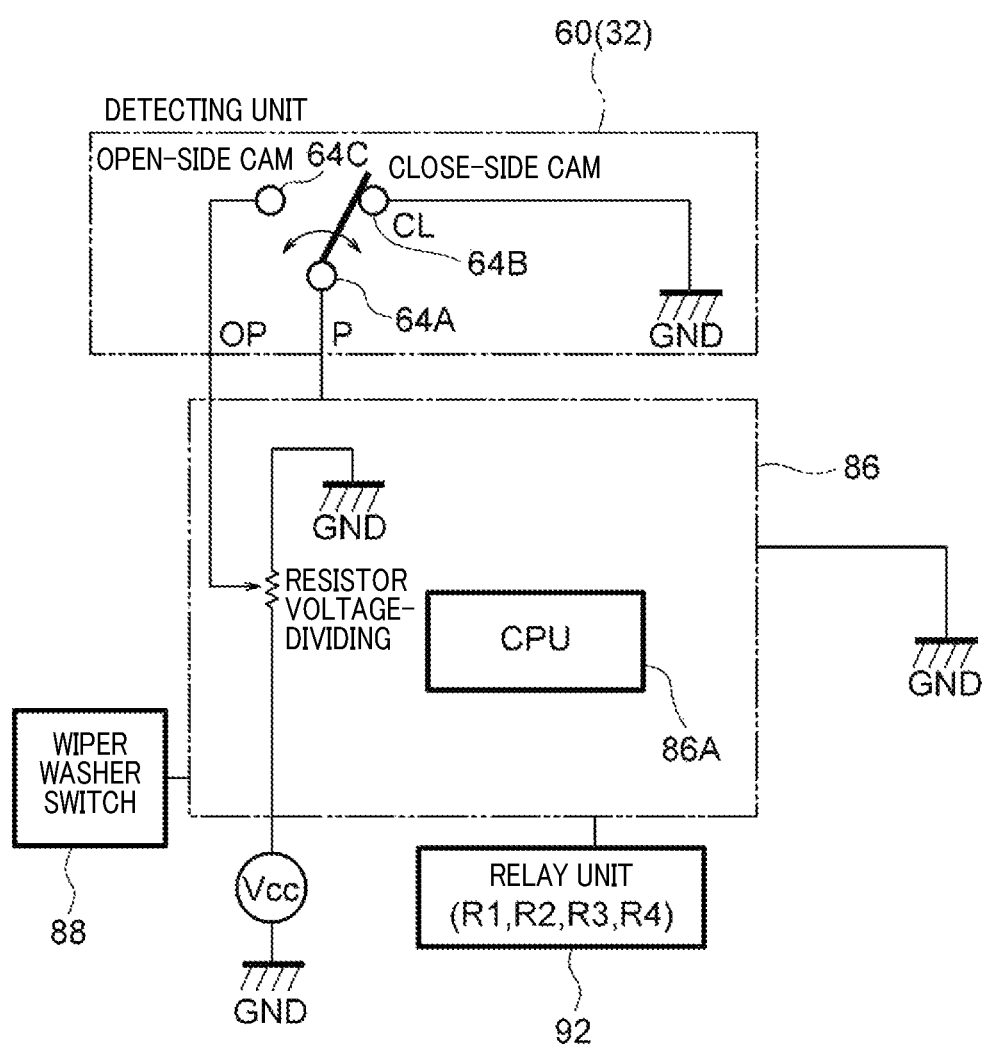
FIG. 10 is a circuit diagram illustrating a configuration of a detecting unit that is included in the vehicle wiper apparatus according to the first embodiment and a periphery thereof.

Next, a circuit configuration and control of the wiper apparatus 10 will be described with reference to FIG. 8 to FIG. 11. Here, in FIG. 8 to FIG. 11, open and close are denoted by as "OPEN" and "CLOSE." As shown in FIG. 8, the motor 34 of the wiper motor 32 is connected to a positive side of a power supply by a relay R1 and a relay R2 (not shown in FIG. 3). The relay R1 is an ON-OFF relay for turning ON/OFF the motor 34. The relay R2 is a switching relay for switching between the low-speed wiping mode (LOW) and the high speed wiping mode (HIGH). In addition, as shown in FIG. 9, the washer motor 84 of the washer pump 82 is connected to a positive side of a power supply by a relay R3 and a relay R4. The relay R3 is an ON-OFF relay for when the washer motor 84 is rotated forward. The relay R4 is an ON-OFF relay for when the washer motor 84 is rotated in reverse. These relays R1, R2, R3, and R4 are normally closed (NC) contact types.

A relay unit 92 that includes the above-described relays R1, R2, R3, and R4 is electrically connected to the input/output interface unit 86D (see FIG. 3) of the ECU 86. The ECU 86 is configured to control the relays R1, R2, R3, and R4 of the relay unit 92 based on the position of the wiper/washer switch 88. For example, when the wiper/washer switch 88 is switched to the low-speed wiping mode selection position, the ECU 86 may turn ON the relay R1 and maintain the relay R2 at OFF (NC). As a result, the wiper motor 32 continuously rotates in one direction at low speed. In addition, for example, when the wiper/washer switch 88 is switched to the high-speed wiping mode selection position, the ECU 86 may turn ON both the relay R1 and the relay R2. As a result, the wiper motor 32 continuously rotates in one direction at high speed. Then, when the wiper/washer switch 88 is switched to the OFF position, the ECU 86 first turns OFF (NC) the relay R2. When the CL terminal 64B subsequently comes into contact with the close-side cam 62A and the P terminal becoming 0 V is detected, the ECU 86 turns OFF (NC) the relay R1. That is, when the wiper member 18 reaches the closed position P1 by the close operation, the ECU 86 stops the wiper motor 32.

In addition, when the washer switch 90 is turned ON, the ECU 86 turns ON the relay R1, maintains the relay R2 at OFF (NC), and further controls the relays R3 and R4 in a following manner based on the electrical connection states of the P terminal 64A, the CL terminal 64B, and the OP terminal 64C. That is, when the washer switch 90 is turned ON, the ECU 86 rotates the wiper motor 32 at low speed and detects an amount of time required for the washer member 18 to make a single round trip (round-trip time) based on the electrical connection states of the P terminal 64A, the CL terminal 64B, and the OP terminal 64C. In other words, this round-trip time is a rotation time over which the wiper member 18 reaches the closed position P1 again from the closed position P1, and is equivalent to an amount of time for the output shaft 48 of the wiper motor 32 to make a single rotation. Then, the ECU 86 switches the ON/OFF states of the relays R3 and R4 based on the detected round-trip time and controls operation of the washer motor 84.

In a state in which the relay R4 is turned off (NC) while the relay R3 is turned ON, the washer motor 84 (washer pump 82) rotates forward and the cleaning fluid is sprayed from the first nozzle 24A. In addition, in a state in which the relay R4 is turned ON while the relay R3 is turned OFF (NC), the washer motor 84 rotates in reverse and the cleaning fluid is sprayed from the second nozzle 24B. Furthermore, in a state in which both the relay R3 and the relay R4 are turned OFF (NC), the washer motor 84 forms a closed circuit and is stopped by dynamic braking.

The ECU 86 is configured to detect the electrical connection states of the P terminal 64A, the CL terminal 64B, and the OP terminal 64C by a voltage (cam signal) that is generated at the P terminal 64A. Here, between the terminals 64A to 64C and the cam plate 62, a minute current, serving as an electrical signal, flows due to resistance on the ECU side (not shown), rather than a large current that drives the washer motor as in conventional technology. The P terminal 64A is electrically connected to the CPU 86A and the CL terminal 64B is connected to the ground. In addition, the OP terminal 64C is electrically connected to a power supply through a resistor. A voltage that is divided by the resistor (here, as an example, a voltage that is ½ of a power supply voltage Vcc) is generated at the OP terminal 64C.

In a state in which the close-side cam 62A of the cam plate 62 is in contact with the CL terminal 64B, the voltage at the P terminal is 0 V. As a result, the ECU 86 determines that the wiper member 18 is positioned in the closed position P1. In addition, in a state in which the open-side cam 62B of the cam plate 62 is in contact with the OP terminal 64C, the voltage at the P terminal 64A is ½Vcc. As a result, the ECU 86 determines that the wiper member 18 is positioned in the open position P2. Here, in the state in which the cam plate 62 is not in contact with either of the CL terminal 64B and the OP terminal 64C, the voltage at the P terminal 64A is Vcc.

Figure 11:
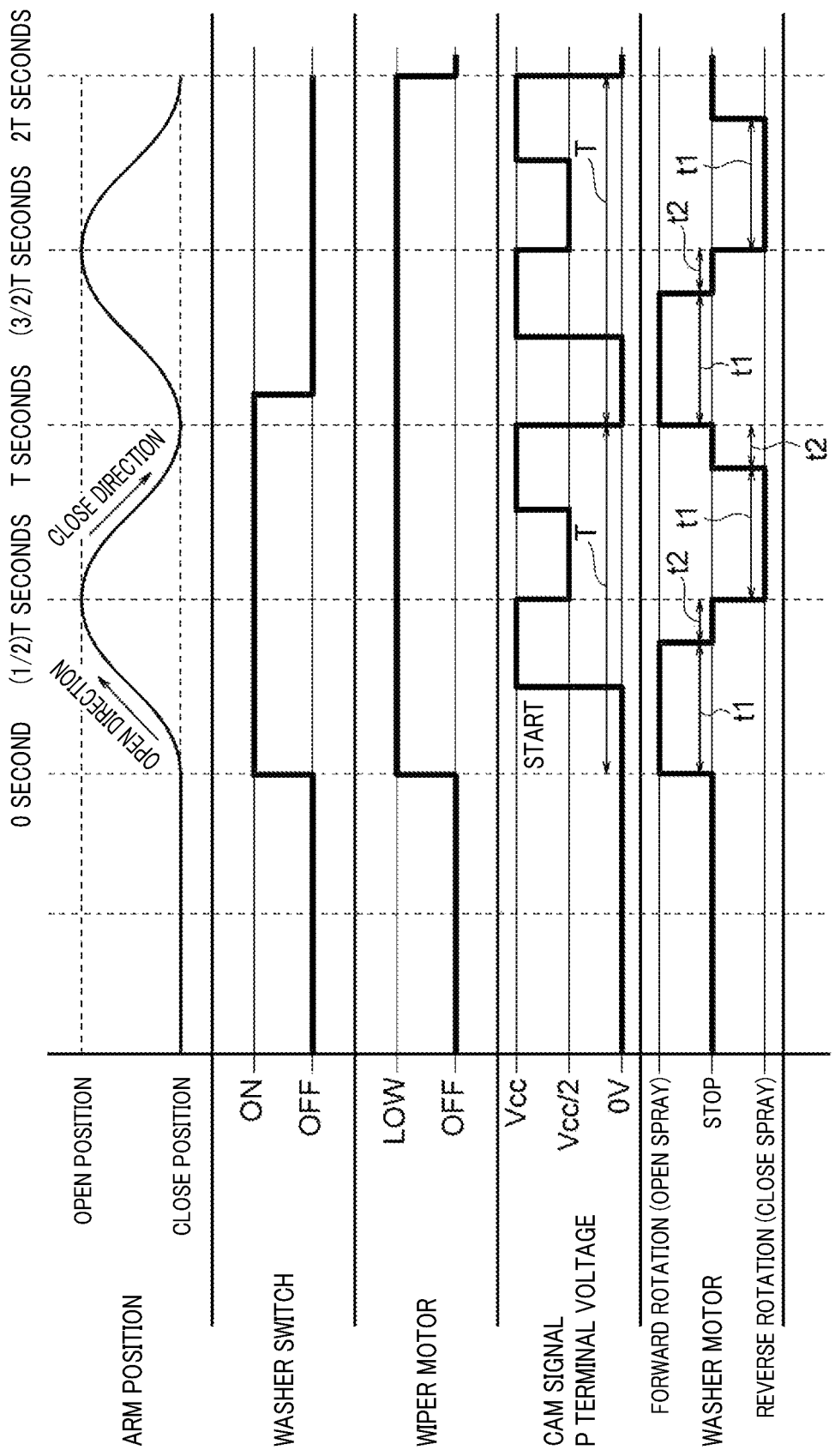
FIG. 11 is a timing chart for explaining control of the vehicle wiper apparatus according to the first embodiment.

Next, operation control of the wiper motor 32 and the washer motor 84 when the washer switch 90 is turned ON will be described with reference to FIG. 11. FIG. 11 shows the operation control when the washer switch 90 is turned ON in a state in which the wiper motor 32, that is, the wiper apparatus 10 is not operating. In FIG. 11, as an example, the round-trip time of the wiper member 18 is T seconds. A case in which an amount of time over which the washer switch 90 is turned ON is equal to or greater than T seconds and less than 2T seconds is shown. When the washer switch 90 is operated in this manner, the wiper motor 32 is configured to be operated at low speed for only a fixed amount of time. As an example, an operation time of the wiper motor 32 in this case is 2T seconds that is the amount of time required for the wiper member 18 to make two round trips. Here, when the amount of time over which the washer switch 90 is turned ON is equal to or greater than 2T seconds, the operation time of the wiper motor is a number of seconds that is equal to or greater than 3T seconds and an integer multiple of T.

As shown in FIG. 11, when the washer switch 90 is turned ON and the wiper motor 32 is started, at ½ T seconds after startup, the wiper member 18 reverses at the open position P2. Then, at ½ T seconds after reversing, the wiper member 18 reverses at the closed position P1. Furthermore, at ½ T seconds thereafter, the wiper member 18 reverses at the open position P2. At ½ T seconds after reversing, the wiper member 18 stops at the closed position P1.

While the wiper member 18 makes two round trips as described above, the ECU 86 detects the round-trip time (time to which reference symbol T is attached in FIG. 11) of the wiper member 18 based on the voltage (cam signal) that is generated at the P terminal 64A and controls the operation of the washer motor 84 based on the detection result. In this case, the ECU 86 is configured to alternately repeat operation and pause of the washer motor 84 in correspondence with the open operation and the close operation of the wiper member 18. "Pause" in this case is "temporarily stopped"

and "stop," described hereafter, is simply "stopped." In the case of "pause," the washer motor 84 resumes operating. However, in the case of "stop," the washer motor does not resume operating unless the washer switch 90 is turned ON again.

As shown in FIG. 11, when the washer switch 90 is turned ON, the wiper member 18 is positioned in the closed position P1 and the voltage at the P terminal 64A is 0 V. Therefore, the ECU 86 operates the washer motor 84 in forward rotation for t1 seconds and then pauses the washer motor 84 for t2 seconds. In this case, a setting is such that t1+t2=T and t1>t2. As a result of the forward rotation of the washer motor 84, the cleaning fluid is sprayed from the first nozzle 24A towards the front side in the advancing direction of the wiper member 18 that performs the open operation, and spraying of the cleaning fluid is paused before the wiper member 18 reaches the open position P2.

In addition, when the wiper member 18 reaches the open position P2 and reverses, because the voltage at the P terminal is ½ Vcc, the ECU 86 operates the washer motor 84 in reverse rotation for t1 seconds and then pauses the washer motor 84 for t2 seconds. As a result of the reverse rotation of the washer motor 84, the cleaning fluid is sprayed from the second nozzle 24B towards the front side in the advancing direction of the wiper member 18 that performs the close operation, and spraying of the cleaning fluid is paused before the wiper member 18 reaches the closed position P1.

In addition, when the wiper member 18 reaches the closed position P1 and reverses, the voltage at the P terminal 64A is again 0 V. Therefore, the ECU 86 operates the washer motor 84 in forward rotation for t1 seconds and then pauses the washer motor 84 for t2 seconds. As a result, the cleaning fluid is sprayed from the first nozzle 24A towards the front side in the advancing direction of the wiper member 18 that performs the open operation, and spraying of the cleaning fluid is paused before the wiper member 18 reaches the open position P2.

Subsequently, when the wiper member 18 reaches the open position P2 again and reverses, the voltage at the P terminal 64A is again ½ Vcc. Therefore, the ECU 86 operates the washer motor 84 in reverse rotation for t1 seconds and then stops the washer motor 84. As a result, the cleaning fluid is sprayed from the second nozzle 24B towards the front side in the advancing direction of the wiper member 18 that performs the close operation, and spraying of the cleaning fluid is stopped before the wiper member 18 reaches the closed position P1.

Subsequently, when the wiper member 18 reaches the closed position P1 again, the voltage at the P terminal 64A is 0 V again. The ECU 86 stops the wiper motor 32 and the washer motor 84. The operation during T seconds to 2T seconds is similar to an operation during the initial T seconds. Here, when the washer switch 90 is turned ON during operation of the wiper apparatus 10, the ECU 86 detects the position of the wiper member 18 that is performing the wiping operation by the cam signal. The ECU 86 starts operation control of the washer motor 84 when the wiper member 18 reverses at a next reversing position.

As described above, according to the present embodiment, switching between the forward rotation and the reverse rotation of the washer motor 84 (washer pump 82) is performed between by the forward path and the return path of the reciprocal rotation of the wiper member 18. As a result, the cleaning fluid is sprayed to the front side in the advancing direction of the wiper member 18 on both the forward path and the return path of the reciprocal rotation of the wiper member 18.

In addition, according to the present embodiment, the ECU 86 corrects an operation time t1 and a pause time t2 of the washer motor 84 (washer pump 82) based on variations in the round-trip time of the wiper member 18. That is, rotation frequency of the wiper motor 32 varies based on variations in power supply voltage and variations in load that is applied to the wiper member 18. Therefore, the round-trip time of the wiper member 18 is not necessarily fixed at all times. Consequently, the ECU 86 is configured to detect the variations in the round-trip time of the wiper member 18, that is, the variations in the rotation frequency of the wiper motor 32 and correct the operation time t1 and the pause time t2 of the washer motor 84 based on the variations. Specifically, the ECU 86 is configured to monitor the amounts of time of the open operation and the close operation of the wiper member 18 based on changes in the voltage at the P terminal 64A. When the amounts of time of the open operation and the close operation increase or decrease, the ECU 86 increases or decreases the operation time t1 and the pause time t2 based on proportions of the increase or decrease.

(Workings and Effects)

Next, workings and effects according to the present embodiment will be described. In the wiper apparatus 10 according to the present embodiment, the ECU 86 that is mounted to the vehicle controls operation of the wiper motor 32. The wiper motor 32 is operated to rotate the output shaft 48 in one direction. The rotation in one direction of the output shaft 48 is converted to the reciprocal rotation of the pivot shaft 74 by the link mechanism 70. As a result, the wiper member 18 that is attached to the pivot shaft 74 reciprocally rotates between the closed position P1 and the open position P2. The first nozzle 24A that is provided in the wiper member 18 is capable of spraying the cleaning fluid towards the front side in the advancing direction of the wiper member 18 on the forward path of the above-described reciprocal rotation. In addition, the second nozzle 24B that is provided in the wiper member 18 is capable of spraying the cleaning fluid towards the front side in the advancing direction of the wiper member 18 on the return path of the above-described reciprocal rotation. The cleaning fluid is supplied to the first nozzle 24A and the second nozzle 24B by the washer pump 83 being operated.

In addition, the wiper apparatus 10 includes the detecting unit 60 that is capable of detecting the states in which the wiper member 18 is positioned in the closed position P1 and the open position P2. When the wiper member 18 is reciprocally rotating as described above, the detecting unit 60 detects the state in which the wiper member 18 is positioned in the closed position P1 and the state in which the wiper member 18 is positioned in the open position P2 at a predetermined time interval. The ECU 86 detects the round-trip time of the wiper member 18 based on the detection result from the detecting unit 60. Furthermore, the ECU 86 controls the operation of the washer pump 82 based on the detected round-trip time. As a result, the washer pump 82 is operated during rotation of the wiper member 18 on the above-described forward path and return path. The cleaning fluid is sprayed towards the front side in the advancing direction of the wiper member 18 from the first nozzle 24A and the second nozzle 24B. According to this configuration, a mechanical switching valve for the cleaning fluid is unnecessary, and a structure is simplified.

Moreover, the above-described detecting unit 60 is merely required to be capable of acquiring an electrical signal that enables detection of the state in which the wiper member 18 is positioned in the closed position P1 and the state in which the wiper member 18 is positioned in the open position P2, and is not that which is supplied a relatively large drive current to drive the washer pump 82. Consequently, even in the configuration in which the detecting unit 60 is mounted in the wiper motor 32, radio noise of the wiper motor 32 can be prevented from worsening and adversely affecting other electronic apparatuses on the vehicle side.

Here, in a vehicle wiper apparatus of a type in which a control board (control circuit) that has a field-effect transistor (FET) and an angle sensor, such as a Hall integrated circuit (IC), are mounted in a wiper motor, and the wiper motor is controlled to rotate forward and in reverse, a rotation angle and a rotation direction of an output shaft of the wiper motor can be detected by the above-described angle sensor. The above-described control board can control operation of a washer pump based on the detection result. However, in a case of this configuration, the wiper motor is complex and expensive. In this regard, according to the present embodiment, the detecting unit 60 that is mounted in the wiper motor 32 is merely required to be that which is capable of acquiring an electrical signal that enables detection of the state in which the wiper member 18 is positioned in the closed position P1 and the state in which the wiper member 18 is positioned in the open position P2. Moreover, because the ECU 86 that is mounted to the vehicle separately from the wiper apparatus 10 controls the operations of the wiper motor 32 and the washer pump 82, a control board is not required to be mounted in the wiper motor 32. Consequently, according to the present embodiment, the wiper apparatus 10 that includes the wiper motor 32 can be simple and inexpensive.

In addition, according to the present embodiment, the washer pump 82 of which the operation is controlled by the ECU 86 is switched between the forward rotation and the reverse rotation, between the forward path and the return path of the wiper member 18. When the washer pump 82 rotates forward, the cleaning fluid is supplied to the first nozzle 24A. When the washer pump 82 rotates in reverse, the cleaning fluid is supplied to the second nozzle 24B. As a result, the cleaning fluid can be separately supplied to the first nozzle 24A and the second nozzle 24B by a single washer pump 82. Consequently, compared to a configuration in which the washer pump has first and second pumps as in the prior art described in the section regarding background art, the configuration of the overall apparatus can be simplified.

Furthermore, according to the present embodiment, the washer pump 82 is operated when the wiper member 18 starts to rotate from either of the closed position P1 and the open position P2, and paused before the wiper member 18 reaches the other of the closed position P1 and the open position P2. Consequently, the cleaning fluid can be prevented from pooling or dripping in the other position. In addition, the cleaning fluid can be conserved.

Moreover, according to the present embodiment, when the rotation frequency of the wiper motor 32 varies and the round-trip time of the wiper member 18 varies due to variations in the voltage that is applied to the wiper motor 32 and the like, the ECU 86 corrects the operation time t1 and the pause time t2 of the washer pump 82. Consequently, the reciprocal rotation of the wiper member 18 and an operation timing of the washer pump 82 can be prevented or suppressed from shifting due to the variations in the rotation frequency.

In addition, according to the present embodiment, during operation of the wiper motor 32, the cam plate 62 that is provided in the wiper motor 32 is rotated in one direction that is the rotation direction of the output shaft 48. As a result of the rotation of the cam plate 62, the electrical connection state to the cam plate 62 of the contact portion 64 that is provided in the wiper motor 32 is switched. As a result of this switching, the position of the wiper member 18 can be detected by a simple configuration.

Furthermore, the cam plate 62 is attached to the insulator 58 that integrally co-rotates in one direction with the worm wheel 46 that integrally rotates with the output shaft 48. As a result, during operation of the wiper motor 32, the cam plate 62 rotates in the above-described one direction together with the output shaft 48 and the worm wheel 46. According to this configuration, for example, when the cam plate 63 that has a differing pattern shape is set in an existing wiper motor, changes in design can be minimized.

In addition, the above-described contact portion 64 includes the P terminal 64A that is electrically connected to the cam plate 62 at all times, the CL terminal 64B that is electrically connected to the cam plate 62 in the state in which the wiper member 18 is positioned in the closed position P1, and the OP terminal 64C that is electrically connected to the cam plate 62 in the state in which the wiper member 18 is positioned in the open position P2. The electrical connection states of these terminals 64A, 64B, and 64C are detected. Thus, the state in which the wiper member 18 is positioned in the closed position P1 and the state in which the wiper member 18 is positioned in the open position P2 can be detected. As a result, for example, the ECU 86 can detect a difference in speed between the open operation and the close operation of the wiper member 18 during strong winds. Consequently, the operation of the washer pump 82 can be accurately controlled for both the open operation and the close operation of the wiper member 18.

Here, according to the above-described first embodiment, the operation time t1 and the pause time t2 of the washer pump 82 are set to be the same for the open operation and the close operation of the wiper member 18. However, this is not limited thereto. The operation time t1 and the pause time t2 of the washer pump 82 may be configured to be separately controlled by a control apparatus for the open operation and the close operation of the wiper member 18. As a result, for example, the washer pump 82 can be appropriately operated in correspondence with the differences in speed between the open operation and the close operation of the wiper member 18 during strong winds or the like. That is, during strong winds or the like, the open operation of the wiper member 18 may be faster than the close operation. However, even in such cases, according to the above-described configuration, appropriate control of the washer pump 82 can be performed.

Second Embodiment

Next, a second embodiment of the present disclosure will be described. Here, configurations and workings that are basically similar to those according to the first embodiment are given the same reference numbers as those according to the first embodiment. Descriptions thereof are omitted.

Figure 12:
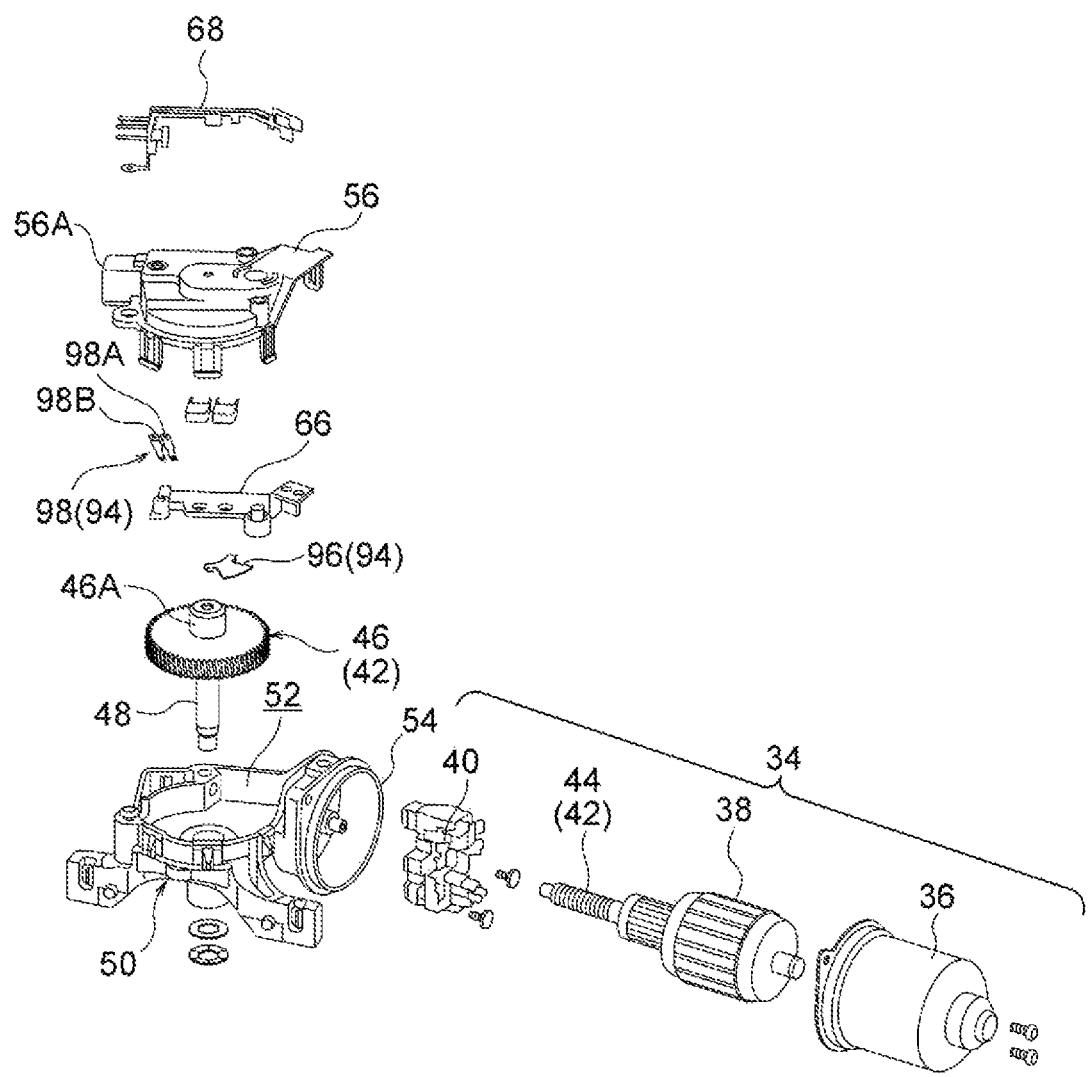
FIG. 12 is an exploded perspective view of a wiper motor that is included in a vehicle wiper apparatus according to a second embodiment.
Figure 13:
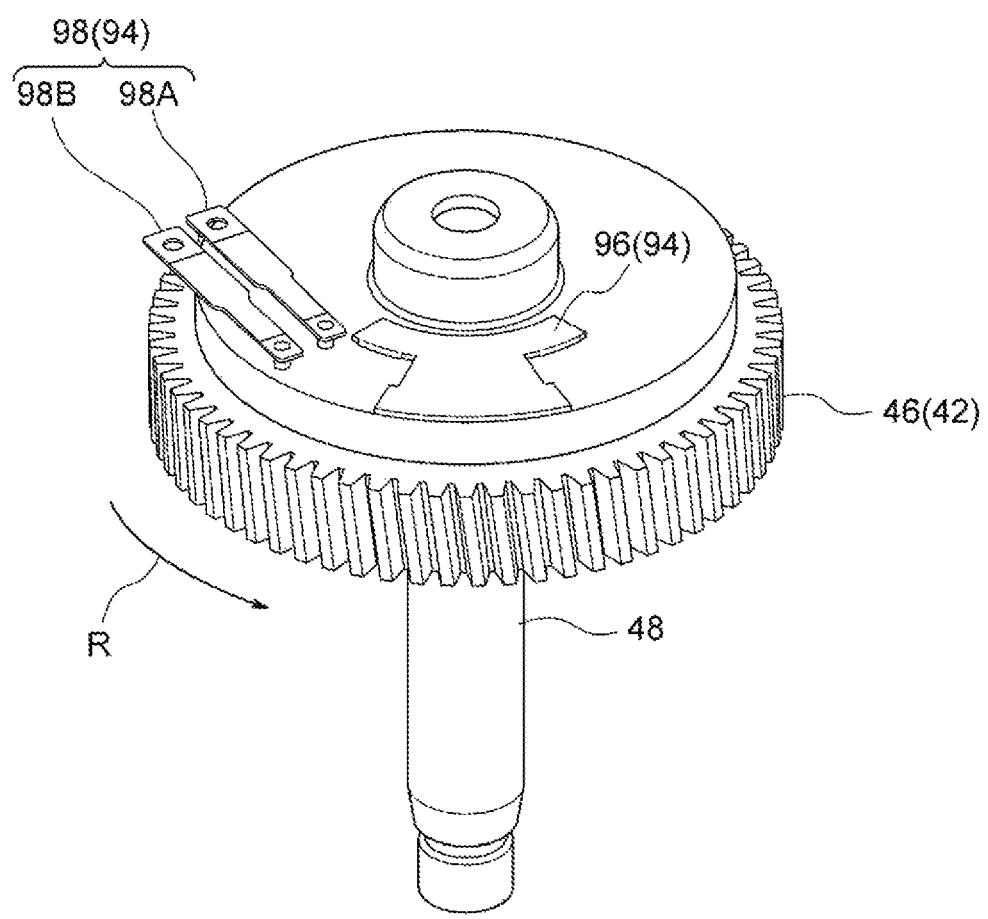
FIG. 13 is a perspective view of a configuration of a detecting unit that is mounted in the wiper motor and a periphery thereof.

FIG. 12 shows an exploded perspective view of the wiper motor 32 that is included in a vehicle wiper apparatus according to the second embodiment of the present disclosure. According to this embodiment, the wiper motor 32 is provided with a detecting unit 94 that differs from the detecting unit 60 according to the first embodiment. The insulator 58 according to the first embodiment is omitted. Here, in FIG. 12, the crank arm 72 and peripheral members thereof are omitted.

The above-described detecting unit 94 is configured by a cam plate 96 that is directly attached to the worm wheel 46, and a P terminal 98A and a CL terminal 98B that serve as a pair of terminals. The cam plate 96 is not formed into a ring shape like the cam plate 62 according to the first embodiment, but rather is a substantially fan-like plate-shaped piece that is formed concentrically around the axis of the output shaft 48. The cam plate 96 is attached to a portion on an outer circumferential side of the surface on the cover 56 side of the worm wheel 46 by a means such as claw fitting. The P terminal 98A and the CL terminal 98B provide functions similar to those of the P terminal 64A and the CL terminal 64B according to the first embodiment, and are attached to the inner surface of the cover 56. The P terminal 98A and the CL terminal 98B are arranged so as to be electrically connected to the cam plate 96 in the state in which the wiper member 18 is positioned in the closed position P1.

According to this embodiment, the ECU 86 is configured to detect electrical connection states of the P terminal 98A and the CL terminal 98B based on a voltage (cam signal) that is generated at the P terminal 98A. Here, in a manner similar to that according to the first embodiment, between the terminals 98A and 98B and the cam plate 96, a minute current, serving as an electrical signal, flows due to resistance on the ECU side (not shown), rather than a large current that drives the washer motor as in conventional technology. The P terminal 98A is electrically connected to the CPU 86A and the CL terminal 98B is connected to the ground. As a result, in a state in which the cam plate 96 is in contact with the P terminal 98A and the CL terminal 98B, the voltage at the P terminal 98A is 0 V In a state in which the cam plate 96 is not in contact with the P terminal 98A and the CL terminal 98B, the voltage at the P terminal 98A is the power supply voltage Vcc. Therefore, the ECU 86 detects that the wiper member 18 is in the closed position P1, as a result of the voltage generated at the P terminal 98A becoming 0 V.

Figure 14:
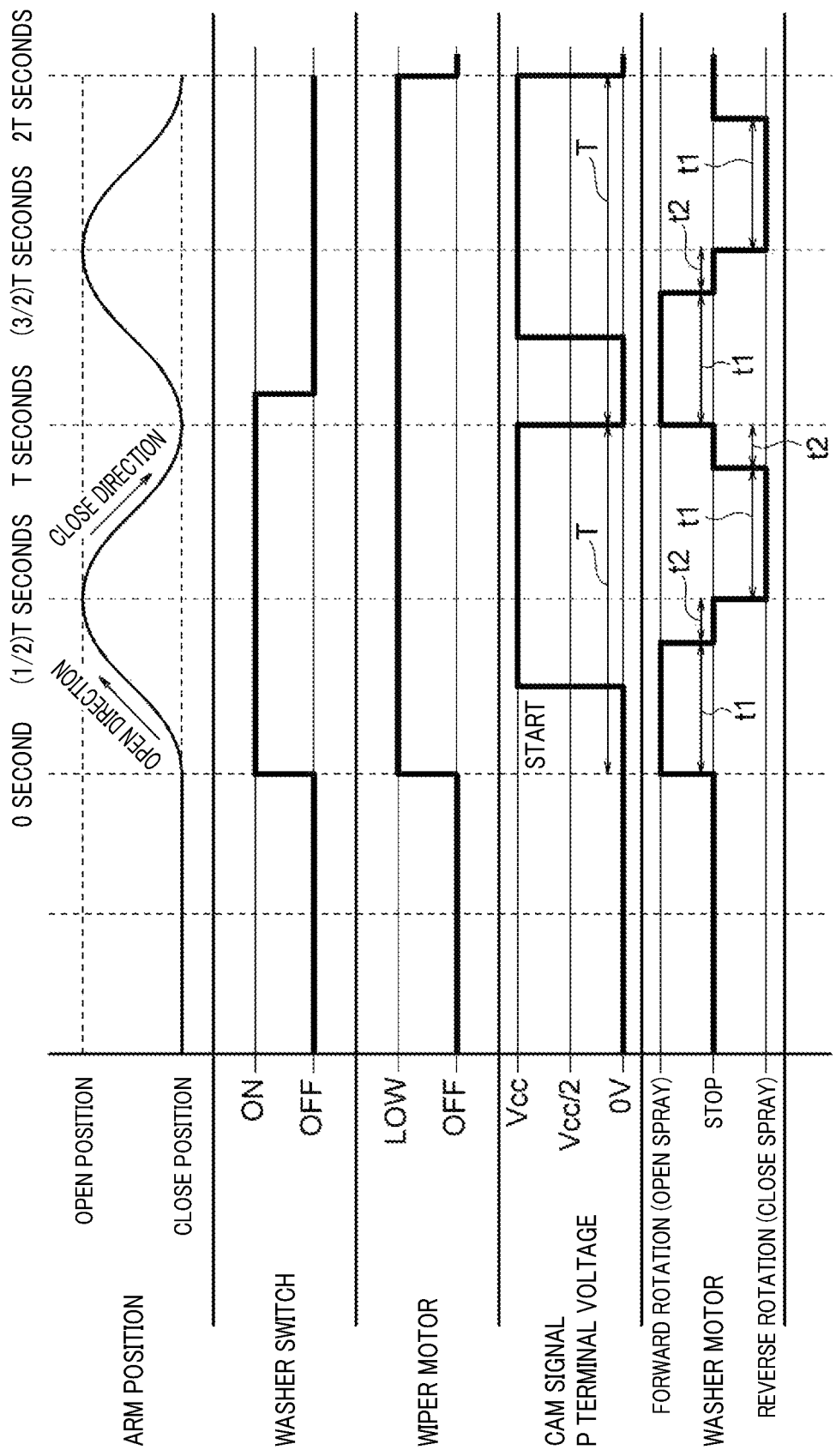
FIG. 14 is a timing chart for explaining control of the vehicle wiper apparatus according to the second embodiment.

According to the present embodiment, as shown in FIG. 14, when the washer switch 90 is turned ON in a manner similar to that according to the first embodiment, the ECU 86 detects the round-trip time (time to which reference symbol T is attached in FIG. 14) of the wiper member 18 based on the voltage (cam signal) that is generated at the P terminal 98A and controls the operation of the washer motor 84 based on the detection result. Here, in a manner similar to FIG. 11, FIG. 14 shows operation control when the washer switch 90 is turned ON in the state in which the wiper apparatus 10 is not operating.

Specifically, when the washer switch 90 is turned ON, because the voltage at the P terminal 98A is 0 V, the ECU 86 operates the washer motor 84 in forward rotation for t1 seconds and then pauses the washer motor 84 for t2 seconds. As a result of the forward rotation of the washer motor 84, the cleaning fluid is sprayed from the first nozzle 24A towards the front side in the advancing direction of the wiper member 18 that performs the open operation, and spraying of the cleaning fluid is paused before the wiper member 18 reaches the open position P2.

In addition, the ECU 86 counts time by a clock pulse. The ECU 86 determines that the wiper member 18 has reached the open position P2 and will reverse upon elapse of ½ T seconds from the start of rotation of the wiper motor 32. The ECU 86 operates the washer motor 84 in reverse rotation for t1 seconds and then pauses the washer motor 84 for t2 seconds. As a result of the reverse rotation of the washer motor 84, the cleaning fluid is sprayed from the second nozzle 24B towards the front side in the advancing direction of the wiper member 18 that performs the close operation, and spraying of the cleaning fluid is paused before the wiper member 18 reaches the closed position P1.

Furthermore, when the wiper member 18 reaches the closed position P1 and reverses, the voltage at the P terminal 64A is again 0 V. Therefore, the ECU 86 operates the washer motor 84 in forward rotation for t1 seconds and then pauses the washer motor 84 for t2 seconds. As a result, the cleaning fluid is sprayed from the first nozzle 24A towards the front side in the advancing direction of the wiper member 18 that performs the open operation, and spraying of the cleaning fluid is paused before the wiper member 18 reaches the open position P2.

In addition, the ECU 86 determines that the wiper member 18 has reached the open position P2 and will reverse again upon elapse of 3⁄2 T seconds from the start of rotation of the wiper motor 32. The ECU 86 operates the washer motor 84 in reverse rotation for t1 seconds and then stops the washer motor 84. As a result of the reverse rotation of the washer motor 84, the cleaning fluid is sprayed from the second nozzle 24B towards the front side in the advancing direction of the wiper member 18 that performs the close operation, and spraying of the cleaning fluid is stopped before the wiper member 18 reaches the closed position P1.

Subsequently, when the wiper member 18 reaches the closed position P1 again, the voltage at the P terminal 64A is 0 V again. The ECU 86 stops the wiper motor 32 and the washer motor 84. According to this embodiment, configurations other than those described above are similar to those according to the first embodiment.

According to this embodiment, the state in which the wiper member 18 is positioned in the open position P1 is not detected and the state in which the wiper member 18 is subsequently positioned in the closed position P1 from the closed position P1 is detected. In addition, the cam plate 96 is directly fixed to the worm wheel 46. In other respects, working effects similar to those according to the first embodiment can be achieved. Furthermore, according to this embodiment, the configuration of the detecting unit 94 is simpler than that according to the first embodiment and the insulator 58 is omitted. Consequently, the configuration of the wiper motor 32 can be made simpler than that according to the first embodiment.

<Supplementary Descriptions According to the Embodiments>

Here, according to the above-described embodiments, the washer pump 82 is configured to be operated during both the open operation and the close operation of the washer member 18. However, this is not limited thereto. The washer pump 82 may be configured to be operated only during either of the open operation and the close operation. To perform control in this manner, all that is required is for the control program of the ECU 86 to be modified. The first nozzle 24A or the second nozzle 24B can be omitted. For example, when the washer pump 82 is operated only during the open operation, the washer pump 82 is preferably operated for a predetermined amount of time when the wiper member 18 starts to rotate from the closed position P1 that is a starting point of the open operation, and the washer pump 82 is preferably paused before the wiper member 18 reaches the open position P2 that is an ending point of the open operation.

In addition, according to the above-described embodiments, the detecting unit 60 or 94 that is provided in the wiper motor 32 is configured to include the cam plate 62 or 96 and the contact portion 64 or 98. However, this is not limited thereto. The detecting unit may be merely required to be capable of detecting at least the state in which the wiper member 18 is positioned in the closed position. The detecting unit may be a microswitch or the like. In addition, according to the above-described embodiments, the detecting unit is provided in the wiper motor 32. However, this is not limited thereto. The detecting unit may be configured to be provided somewhere other than in the wiper motor 32 (such as in a swing limit position that corresponds to the closed position of the link mechanism 70).

Furthermore, a structure such as the wiper motor 32 and the link mechanism 70 (conversion mechanism) according to the above-described embodiments is merely an example. The structure may be modified as appropriate.

Moreover, according to the above-described embodiments, a case in which the present disclosure is applied to the wiper apparatus 10 that is a front wiper apparatus is described. However, this is not limited thereto. The present disclosure can also be applied to a rear wiper apparatus, an outer-mirror wiper apparatus, and the like of the vehicle.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A vehicle wiper apparatus comprising:
   a wiper motor of which operation is controlled by a control apparatus that is mounted to a vehicle and that is operated to rotate an output shaft in one direction;
   a conversion mechanism that converts the rotation in one direction of the output shaft to reciprocal rotation of a pivot shaft;
   a wiper member that is attached to the pivot shaft and reciprocally rotates between a closed position and an open position;
   a nozzle that is provided in the wiper member and is configured to spray a cleaning fluid towards a front side in an advancing direction of the wiper member on at least one of a forward path and a return path of the reciprocal rotation;
   a washer pump that is operated to supply the cleaning fluid to the nozzle; and
   a detecting unit that is configured to detect at least a state in which the wiper member is positioned in the closed position, wherein:
   a round-trip time of the wiper member is detected by the control apparatus based on a detection result of the detecting unit;
   an operation time and a pause time of the washer pump are set based on the round-trip time of the wiper member;
   the washer pump is controlled by the control apparatus, based on the operation time and the pause time of the washer pump set based on the round-trip time of the wiper member detected by the control apparatus; and
   the washer pump is operated during rotation of the wiper member on at least one of the forward path and the return path.

2. The vehicle wiper apparatus according to claim 1, wherein:
   the rotation of the wiper member on at least one of the forward path and the return path is an open operation in which the wiper member rotates from the closed position to the open position.

3. The vehicle wiper apparatus according to claim 1, wherein:
   the detecting unit includes
   a cam plate that is provided in the wiper motor and rotates in one direction during operation of the wiper motor, and
   a contact portion of which an electrical connection state in relation to the cam plate is switched by rotation of the cam plate.

4. The vehicle wiper apparatus according to claim 2, wherein:
   the nozzle includes
   a first nozzle that is configured to spray the cleaning fluid towards the front side in the advancing direction of the wiper member during the open operation and
   a second nozzle that is configured to spray the cleaning fluid towards the front side in the advancing direction of the wiper member during a close operation in which the wiper member rotates from the open position to the closed position;
   the washer pump supplies the cleaning fluid to the first nozzle by rotating forward and supplies the cleaning fluid to the second nozzle by rotating in reverse;
   the control apparatus switches between the forward rotation and the reverse rotation of the washer pump; and
   the control apparatus switches between the open operation and the close operation.

5. The vehicle wiper apparatus according to claim 2, wherein:
   the washer pump is paused before the wiper member that performs the open operation reaches the open position.

6. The vehicle wiper apparatus according to claim 4, wherein:
   the washer pump is paused before the wiper member that performs the open operation reaches the open position.

7. The vehicle wiper apparatus according to claim 4, wherein:
   the washer pump is paused or stopped before the wiper member that performs the close operation reaches the closed position.

8. The vehicle wiper apparatus according to claim 4, wherein:
   the detecting unit is configured to detect a state in which the wiper member is positioned in the open position.

9. The vehicle wiper apparatus according to claim 6, wherein:
   the washer pump is paused or stopped before the wiper member that performs the close operation reaches the closed position.

10. The vehicle wiper apparatus according to claim 6, wherein:
    the operation time and the pause time of the washer pump are corrected by the control apparatus, based on variations in the round-trip time.

11. The vehicle wiper apparatus according to claim 9, wherein:

the operation time and the pause time of the washer pump are corrected by the control apparatus, based on variations in the round-trip time.

12. The vehicle wiper apparatus according to claim 11, wherein:
the detecting unit is configured to detect a state in which the wiper member is positioned in the open position.

13. The vehicle wiper apparatus according to claim 12, wherein:
the operation time and the pause time of the washer pump are separately controlled by the control apparatus for the open operation and the close operation.

14. The vehicle wiper apparatus according to claim 13, wherein:
the detecting unit includes
a cam plate that is provided in the wiper motor and rotates in one direction during operation of the wiper motor, and
a contact portion of which an electrical connection state in relation to the cam plate is switched by rotation of the cam plate.

15. The vehicle wiper apparatus according to claim 14, wherein:
the wiper motor includes a gear that integrally rotates with the output shaft; and
the cam plate is directly or indirectly attached to the gear and integrally rotates in the one direction.

16. The vehicle wiper apparatus according to claim 14, wherein:
the contact portion includes
a first terminal that is electrically connected to the cam plate at all times;
a second terminal that is electrically connected to the cam plate in a state in which the wiper member is positioned in the closed position, and
a third terminal that is electrically connected to the cam plate in a state in which the wiper member is positioned in the open position.

17. The vehicle wiper apparatus according to claim 14, wherein:
the contact portion includes a pair of terminals that are electrically connected to the cam plate in a state in which the wiper member is positioned in the closed position.

18. The vehicle wiper apparatus according to claim 15, wherein:
the contact portion includes
a first terminal that is electrically connected to the cam plate at all times;
a second terminal that is electrically connected to the cam plate in a state in which the wiper member is positioned in the closed position, and
a third terminal that is electrically connected to the cam plate in a state in which the wiper member is positioned in the open position.

19. The vehicle wiper apparatus according to claim 15, wherein:
the contact portion includes a pair of terminals that are electrically connected to the cam plate in a state in which the wiper member is positioned in the closed position.

* * * * *